United States Patent Office

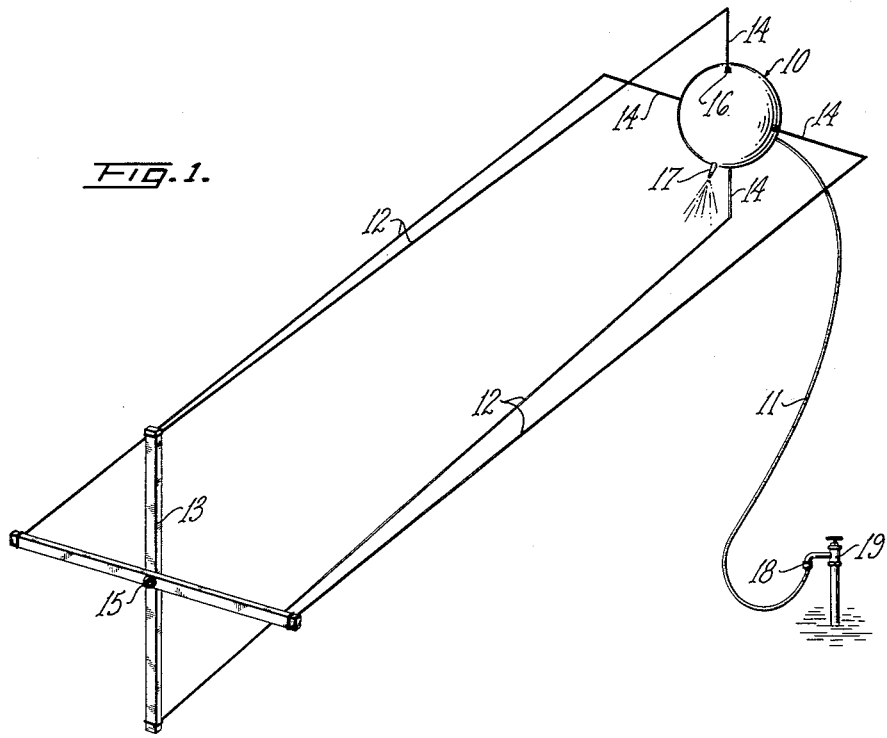
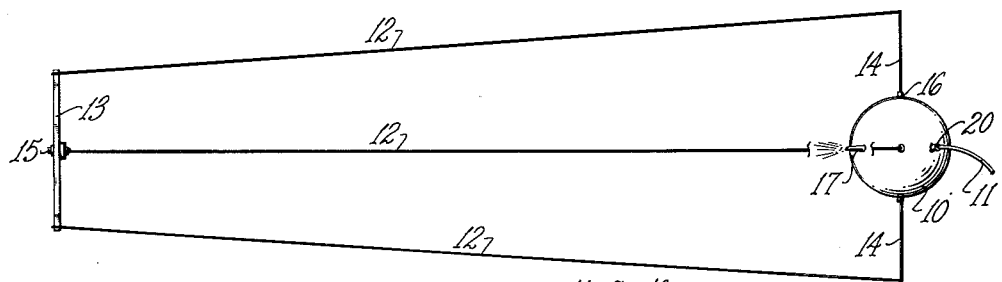
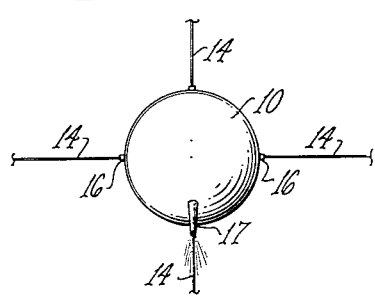
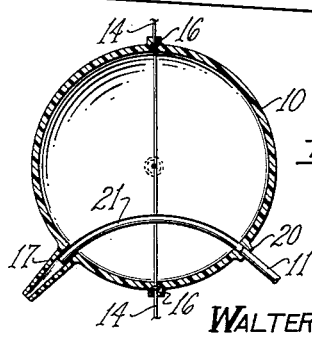

2,995,864
Patented Aug. 15, 1961

2,995,864
AERIAL NOVELTY LAWN SPRINKLER
Walter R. Werelius, Jr., 1920 N. Ross, Santa Ana, Calif.
Filed Oct. 16, 1959, Ser. No. 847,011
5 Claims. (Cl. 46—74)

This invention relates to spray type irrigating devices and has as its general object to provide a device combining the functions of spraying water upon a ground surface and operating as a jet propelled aerial toy.

The invention relates specifically to aerial toys and has as an object to provide a jet-propelled aerial toy having tether means adapted to be manipulated so as to guide the toy in various directional movements in soaring flight.

The invention further aims to provide a novel jet-propelled aerial toy simulating an earth satellite in body design and having means for executing operator-controlled soaring action under jet propulsion.

A further object is to provide an improved lawn sprinkling device wherein a water spray through a spray nozzle is utilized to effect a soaring action, and including means for operator control so as to guide the nozzle horizontally to various positions over an area to be sprinkled.

In general, the invention contemplates a hydraulic jet-operated flying platform composed of a hollow body or shell defining a plenum chamber into which water is delivered under pressure from a towed flexible supply tube or hose, having a nozzle adapted to be directed substantially downwardly at an inclination such as to maintain tautness in a plurality of control wires or cords collectively functioning as a controllable tether, and having manual manipulating means for tilting the shell to various positions, whereby to control the position and movement of the device in the air.

Other objects and advantages will become apparent in the ensuing specifications and appended drawing in which:

FIG. 1 is a perspective view of a combined aerial toy and irrigating device embodying my invention;

FIG. 2 is an inverted plan view of the same;

FIG. 3 is a side view facing the manipulating control device; and

FIG. 4 is a sectional view of the device on a verticle plane through the spray nozzle thereof.

Referring now to the drawings in detail, I have shown therein, as an example of one form in which the invention may be embodied, a combined aerial toy and irrigating device comprising, in general, a shell 10 containing a plenum chamber consisting of a length of curved plastic tubing 21 into which water is delivered under pressure through a supply hose 11, and a tether comprising a plurality of tether lines 12 and a manipulating spider 13 to which one end of each tether line is attached, the other end of each line being attached to a respective radiating arm 14 on shell 10.

The shell 10 (FIG. 4) is of light weight plastic material. To simulate an earth satellite, it is preferably of spherical form. To avoid excessive weight, it is in the form of a light-weight, thin walled shell. The arms 14 are stiff and not readily bent. They may be of small gauge spring wire. Diametrically opposed arms are preferably integral end portions of a length of wire piercing and traversing the shell and molded into bosses 16 integrally formed externally on the shell 10. The arms 14 are attached to the shell 10 at points equally spaced on a circumference of the shell, and preferably are positioned on radii of the spherical center of the shell 10, intersecting this circumference. Thus the arms 14 will be positioned in the plane of the said circumference, i.e. on equatorial plane of the shell.

The tether lines 12 are of substantially equal length, whereby the plane of manipulating spider 13 will be substantially parallel to the aforesaid equatorial plane of arms 14.

The shell 10 is provided with a jet nozzle 17, which may be formed as an integrally molded part of body 10. The nozzle 17 is positioned to direct its jet or spray diagonally downwardly with respect to the plane of arms 14, and toward the manipulating spider 13 so as to develop a reaction thrust against the shell 10 which will tend to propel the shell away from the spider 13 (thus keeping the control lines 12 taut) and upwardly with respect to the ground, so as to cause the shell 10 to soar in a position elevated above the ground, towing the water hole 11.

The hose 11 is a light-weight flexible hose of small diameter (e.g. ⅜ inch plastic garden hose) having at one end a conventional hose coupling 18 for connection to a water hydrant 19 and having at its other end a connection 20 to the shell 10, communicating with the plenum chamber 21 which is a curved plastic tubing of the same diameter as the supply hose. The connection 20 and nozzle 17 are located on the lower side of the shell in the operative position thereof, the nozzle 17 being inclined diagonally downwardly and toward the manipulating spider 13 so as to propel the shell 10 away from the spider and maintain the control lines 12 taut; and the connection 20 being directed generally downwardly so that when the shell 10 is soaring in an elevated position, the hose will be towed in a depending position.

Many designs can be utilized in the shell 10, such as designs simulating aircraft of various kinds. Where the spherical globe form is utilized, the arms 14 will simulate antennae.

The control spider 13 may consist in a pair of straight bars in crossed relation and secured to one another at the crossing by a suitable securing element 15. Alternatively, a one-piece molded plastic cross may be utilized. When the control lines 12 are stretched taut in the operation of the toy, the arms of the spider 13 will be parallel to the arms 14 of the shell 10.

The control lines 12 are preferably of fine steel wire or cable or cord of comparable strength and lightness.

In the operation of the apparatus, after the shell 10 has been connected to the water supply line 11 and the latter connected to the hydrant 19, the water may be turned on while the control spider 13 is being held, with the wires 12 laid up along the ground between the spider 13 and shell 10, with minimum slack therein. As the water flows through the supply line 11 and the plenum chamber 21 and commences to spray from the nozzle 17, a reaction force will be developed which will drive the shell 10 away from the spider 13 and upwardly (assuming that the spider is being held so as to position the shell 10 with the nozzle 17 directed downwardly). As the shell 10 attains an elevated position, the operator can then manipulate the spider 13 so as to tilt it around its center to shift its plane to various angular positions. The plane of the arms 14 of shell 10 will correspondingly be tilted to remain parallel to the plane of spider 13 thus tilting the shell 10 about its center and causing it to move accordingly. Thus the shell 10 can be caused to execute a series of soaring movements in the air and may be guided in horizontal movements over a lawn surface or other surface to be irrigated or otherwise sprayed with water. Consequently, the device may be simultaneously employed as an aerial toy and as an irrigator, sprinkling the surface beneath it as it travels over the area permitted by the length of hose 11.

I claim:
1. A jet-propelled aerial toy comprising: a shell defining a plenum chamber and having a nozzle for de- livering a propelling jet of fluid therefrom; a flexible tube attached to said shell and communicating with said plenum chamber for delivering fluid under pressure thereinto; a nozzle on said shell communicating with said plenum chamber for delivering a pressure fluid jet therefrom; and a tether comprising a plurality of tether lines attached to said shell at not less than three points spaced around a circumference thereof, said nozzle being positioned to deliver a jet transversely to the plane of said circumference and at an acute angle thereto, and a manipulating spider to which said tether lines are attached at circumferentially spaced points, said spider adapted to be held in an operator's hand and manipulated for directionally controlling said shell in movements induced by the reaction force of said jet, said jet being positioned, with respect to said circumference of tether line attachment points, to direct its jet diagonally toward said manipulating spider, whereby, by holding said spider in a position to direct said nozzle downwardly, its said jet will exert a diagonal elevating force such as to cause said shell to rise from the ground to an elevated suspended-in-air position, take up the slack in said tether line and soar as directed by manipulation of said spider.

2. A device as defined in claim 1, wherein said flexible hose is connected to said shell at a point which becomes approximately the bottom thereof when said shell is soaring as aforesaid.

3. In a combined aerial toy and irrigating device: a shell containing a plenum chamber and having a nozzle for delivering a spray of water therefrom adapted to irrigate a ground surface; means attached to said shell for delivering water under pressure into said plenum chamber; and a tether for positionally controlling said shell in a manner to orient said nozzle in a downwardly inclined position such that the reaction load of said spray will cause said shell to ascend to an elevated, suspended-in-air position and to deliver said spray to said ground surface from said elevated position, said tether further being arranged to guide said shell horizontally in a path such as to spread said spray over an extended area of said ground surface, said water delivering means including a flexible hose adapted for attachment to a water hydrant, and an inlet connection, on said shell, communicating said hose with said plenum chamber, said tether comprising a plurality of tether lines attached to said shell at a plurality of points spaced around the circumference of said shell and operable for guiding said shell horizontally.

4. Apparatus as defined in claim 3, wherein said tether lines are operable for guiding said shell in both horizontal and vertical movements.

5. Apparatus as defined in claim 4, further including a manipulator spider adapted to be held in an operator's hand and having said tether lines attached thereto at circumferentially spaced points.

References Cited in the file of this patent

UNITED STATES PATENTS

| | | |
|---|---|---|
| 2,524,059 | Kennedy | Oct. 3, 1950 |
| 2,824,408 | Cauley | Feb. 25, 1958 |
| 2,921,743 | Westover et al. | Jan. 19, 1960 |

FOREIGN PATENTS

| | | |
|---|---|---|
| 911,223 | France | Mar. 4, 1946 |